US006331363B1

(12) United States Patent
DeCristofaro et al.

(10) Patent No.: US 6,331,363 B1
(45) Date of Patent: *Dec. 18, 2001

(54) BULK AMORPHOUS METAL MAGNETIC COMPONENTS

(75) Inventors: Nicholas John DeCristofaro, Chatham; Peter Joseph Stamatis, Morristown, both of NJ (US)

(73) Assignee: Honeywell International Inc., Morris Township, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/186,914

(22) Filed: Nov. 6, 1998

(51) Int. Cl.[7] ........ G11B 5/66

(52) U.S. Cl. ........ 428/692; 428/694 TM; 428/900; 335/281; 335/284; 335/296

(58) Field of Search ........ 428/692, 694 TM, 428/900; 335/281, 284, 296

(56) References Cited

U.S. PATENT DOCUMENTS

| | | | |
|---|---|---|---|
| 4,672,346 | 6/1987 | Miyamoto et al. | 335/296 |
| 4,734,975 | 4/1988 | Ballard et al. | 29/606 |
| 4,766,378 | 8/1988 | Danby et al. | 324/307 |
| 4,818,966 | 4/1989 | Miyamoto et al. | 335/296 |
| 4,827,235 | 5/1989 | Inomata et al. | 335/297 |
| 4,887,059 | 12/1989 | Asano et al. | 335/281 |
| 4,892,773 | 1/1990 | Chenoweth et al. | 428/121 |
| 5,061,897 | 10/1991 | Danby et al. | 324/318 |
| 5,124,651 | 6/1992 | Danby et al. | 324/318 |
| 5,134,771 | 8/1992 | Lee et al. | 29/605 |
| 5,283,544 | 2/1994 | Sakurai et al. | 335/306 |
| 5,495,222 | 2/1996 | Abele et al. | 335/297 |
| 5,754,085 | 5/1998 | Danby et al. | 335/297 |
| 5,798,680 | 8/1998 | Abele et al. | 335/301 |
| 5,963,117 | 10/1999 | Ohashi | 335/306 |
| 6,014,070 | 1/2000 | Danby et al. | 335/296 |

FOREIGN PATENT DOCUMENTS

| | | | | |
|---|---|---|---|---|
| 984461 A2 | * | 8/1999 | (EP) . | |
| 0 984 461 A2 | | 3/2000 | (EP) | H01F/7/20 |
| 1 004 888 A1 | | 5/2000 | (EP) . | |
| 1 004 889 A2 | | 5/2000 | (EP) . | |
| 1 004 889 A3 | | 5/2000 | (EP) . | |
| 58-148419 | | 3/1983 | (JP) . | |
| 59-181504 | | 10/1984 | (JP) . | |
| 61-131518 | | 6/1986 | (JP) . | |
| WO 94/14994 | * | 7/1994 | (WO) . | |
| WO 95/21044 | | 8/1995 | (WO) . | |
| WO 95/33596 | | 12/1995 | (WO) . | |
| WO 96/00449 | | 1/1996 | (WO) . | |

* cited by examiner

*Primary Examiner*—Leszek Kiliman
(74) *Attorney, Agent, or Firm*—Roger H. Criss

(57) ABSTRACT

A bulk amorphous metal magnetic component has a plurality of layers of amorphous metal strips laminated together to form a generally three-dimensional part having the shape of a polyhedron. The bulk amorphous metal magnetic component may include an arcuate surface, and preferably includes two arcuate surfaces that are disposed opposite each other. The magnetic component is operable at frequencies ranging from between approximately 60 Hz and 20,000 Hz and exhibits a core-loss of between less than or equal to approximately 1 watt-per-kilogram of amorphous metal material for a flux density of 1.4 T and when operated at a frequency of approximately 60 Hz, and a core-loss of less than or approximately equal to 70 watts-per-kilogram of amorphous metal material for a flux density of 0.30T and when operated at a frequency of approximately 20,000 Hz. Performance characteristics of the bulk amorphous metal magnetic component of the present invention are significantly better when compared to silicon-steel components operated over the same frequency range.

31 Claims, 3 Drawing Sheets

BULK AMORPHOUS METAL MAGNETIC COMPONENTS

BACKGROUND OF THE INVENTION

1. Field of the Invention

This invention relates to amorphous metal magnetic components, and more particularly, to a generally three-dimensional bulk amorphous metal magnetic component for large electronic devices such as magnetic resonance imaging systems, television and video systems, and electron and ion beam systems.

2. Description of the Prior Art

Although amorphous metals offer superior magnetic performance when compared to non-oriented electrical steels, they have long been considered unsuitable for use in bulk magnetic components such as the tiles of poleface magnets for magnetic resonance imaging systems (MRI) due to certain physical properties of amorphous metal and the corresponding fabricating limitations. For example, amorphous metals are thinner and harder than non-oriented silicon-steel and consequently cause fabrication tools and dies to wear more rapidly. The resulting increase in the tooling and manufacturing costs makes fabricating bulk amorphous metal magnetic components using such techniques commercially impractical. The thinness of amorphous metals also translates into an increased number of laminations in the assembled components, further increasing the total cost of the amorphous metal magnetic component.

Amorphous metal is typically supplied in a thin continuous ribbon having a uniform ribbon width. However, amorphous metal is a very hard material making it very difficult to cut or form easily, and once annealed to achieve peak magnetic properties, becomes very brittle. This makes it difficult and expensive to use conventional approaches to construct a bulk amorphous metal magnetic component. The brittleness of amorphous metal may also cause concern for the durability of the bulk magnetic component in an application such as an MRI system.

Another problem with bulk amorphous metal magnetic components is that the magnetic permeability of amorphous metal material is reduced when it is subjected to physical stresses. This reduced permeability may be considerable depending upon the intensity of the stresses on the amorphous metal material. As a bulk amorphous metal magnetic component is subjected to stresses, the efficiency at which the core directs or focuses magnetic flux is reduced resulting in higher magnetic losses, increased heat production, and reduced power. This stress sensitivity, due to the magnetostrictive nature of the amorphous metal, may be caused by stresses resulting from magnetic forces during the operation of the device, mechanical stresses resulting from mechanical clamping or otherwise fixing the bulk amorphous metal magnetic components in place, or internal stresses caused by the thermal expansion and/or expansion due to magnetic saturation of the amorphous metal material.

SUMMARY OF THE INVENTION

The present invention provides a bulk amorphous metal magnetic component having the shape of a polyhedron and being comprised of a plurality of layers of amorphous metal strips. Also provided by the present invention is a method for making a bulk amorphous metal magnetic component. The magnetic component is operable at frequencies ranging from about 60 Hz to 20,000 Hz and exhibits improved performance characteristics when compared to silicon-steel magnetic components operated over the same frequency range. More specifically, a magnetic component constructed in accordance with the present invention will have a core-loss of less than or approximately equal to 1 watt-per-kilogram of amorphous metal material when operated at a frequency of approximately 60 Hz and at a flux density of approximately 1.4 Tesla (T), and a magnetic component constructed in accordance with the present invention will have a core-loss of less than or approximately equal to 70 watt-per-kilogram of amorphous metal material when operated at a frequency of approximately 20,000 Hz and at a flux density of approximately 0.30 T.

In a first embodiment of the present invention, a bulk amorphous metal magnetic component comprises a plurality of substantially similarly shaped layers of amorphous metal strips laminated together to form a polyhedrally shaped part.

The present invention also provides a method of constructing a bulk amorphous metal magnetic component. In accordance with a first embodiment of the inventive method, amorphous metal strip material is cut to form a plurality of cut strips having a predetermined length. The cut strips are stacked to form a bar of stacked amorphous metal strip material and annealed. The annealed, stacked bar is impregnated with an epoxy resin and cured. The stacked bar is then cut at predetermined lengths to provide a plurality of polyhedrally shaped magnetic components having a predetermined three-dimensional geometry. The preferred amorphous metal material has a composition defined essentially by the formula $Fe_{80}B_{11}Si_9$.

In accordance with a second embodiment of the method of the present invention, an amorphous metal ribbon is wound about a mandrel to form a generally rectangular core having generally radiused corners. The generally rectangular core is then annealed, impregnated with epoxy resin and cured. The short sides of the rectangular core are then cut to form two magnetic components having a predetermined three-dimensional geometry that is the approximate size and shape of said short sides of said generally rectangular core. The radiused corners are removed from the long sides of said generally rectangular core and the long sides of said generally rectangular core are cut to form a plurality of polyhedrally shaped magnetic components having the predetermined three-dimensional geometry. The preferred amorphous metal material has a composition defined essentially by the formula $Fe_{80}B_{11}Si_9$.

The present invention is also directed to a bulk amorphous metal component constructed in accordance with the above-described methods.

Construction of bulk amorphous metal magnetic components in accordance with the present invention is especially suited for amorphous metal tiles for poleface magnets in high performance MRI systems in television and video systems, and in electron and ion beam systems. The advantages recognized by the present invention include simplified manufacturing, reduced manufacturing time, reduced stresses (e.g., magnetostrictive) encountered during construction of bulk amorphous metal components, and optimized performance of the finished amorphous metal magnetic component.

BRIEF DESCRIPTION OF THE DRAWINGS

The invention will be more fully understood and further advantages will become apparent when reference is bad to the following detailed description of the preferred embodiments of the invention and the accompanying drawings, wherein like reference numeral denote similar elements throughout the several views and in which.

DETAILED DESCRIPTION OF THE PREFERRED EMBODIMENTS

The present invention is directed to a generally polyhedrally shaped bulk amorphous metal component. As used herein, the term polyhedron refers to a three-dimensional solid having a plurality of faces or exterior surfaces. This includes, but is not limited to, rectangles, squares, prisms, and shapes including an arcuate surface.

Figure 1A:
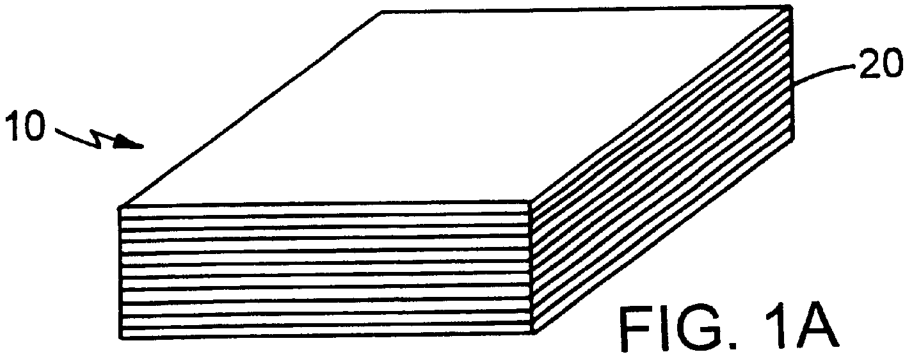
FIG. 1A is a perspective view of a bulk amorphous metal magnetic component in the shape of a generally rectangular polyhedron constructed in accordance with the present invention.
Figure 1B:
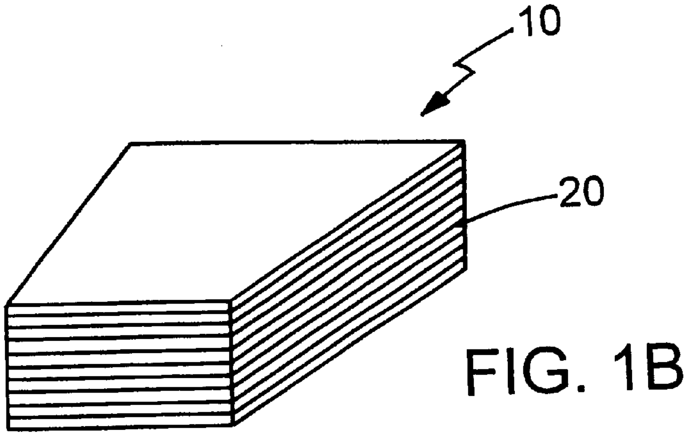
FIG. 1B is a perspective view of a bulk amorphous metal magnetic component in the shape of a generally trapezoidal polyhedron constructed in accordance with the present invention.

Referring to the drawings, there is shown in FIG. 1A a bulk amorphous metal magnetic component 10 having a three-dimensional generally rectangular shape. The magnetic component 10 is comprised of a plurality of substantially similarly shaped layers of amorphous metal strip material 20 that are laminated together and annealed. The magnetic component depicted in FIG. 1B has a three-dimensional generally trapezoidal shape and is comprised of a plurality of layers of amorphous metal strip material 20 that are each substantially the same size and shape and that are laminated together and annealed. The magnetic component depicted in FIG. 1C includes two oppositely disposed arcuate surfaces 12. The component 10 is constructed of a plurality substantially similarly shaped layers of amorphous metal strip material 20 that are laminated together and annealed. In a preferred embodiment, a three-dimensional magnetic component 10 constructed in accordance with the present invention will have a core-loss of less than or approximately equal to 1 watt-per-kilogram of amorphous metal material when operated at a frequency of approximately 60 Hz and at a flux density of approximately 1.4 Tesla (T), and a magnetic component 10 constructed in accordance with the present invention will have a core-loss of less than or approximately equal to 70 watt-per-kilogram of amorphous metal material when operated at a frequency of approximately 20,000 Hz and at a flux density of approximately 0.30 T.

Figure 1C:
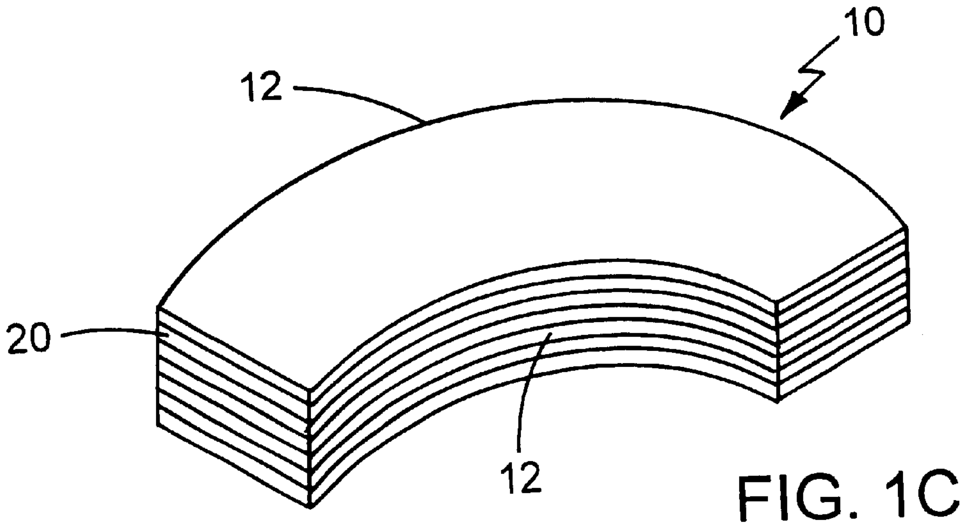
FIG. 1C is a perspective view of a bulk amorphous metal magnetic component in the shape of a polyhedron having oppositely disposed arcuate surfaces and constructed in accordance with the present invention.

The bulk amorphous metal magnetic component 10 of the present invention is a generally three-dimensional polyhedron, and may be generally rectangular, trapezoidal, square, or prism-shaped. Alternatively, and as depicted in FIG. 1C, the component 10 may have at least one arcuate surface 12. In a preferred embodiment, two arcuate surfaces 12 are provided and disposed opposite each other.

Figure 2:
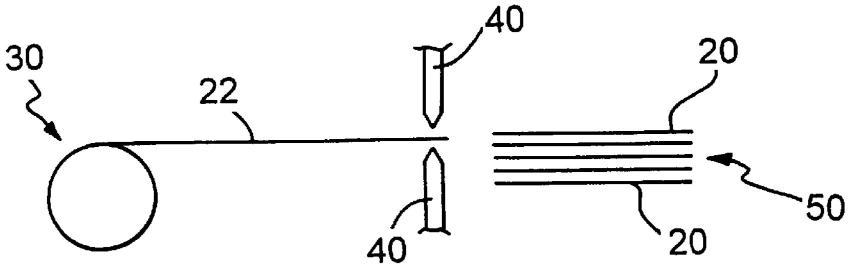
FIG. 2 is a side view of a coil of amorphous metal strip positioned to be cut and stacked in accordance with the present invention.
Figure 3:
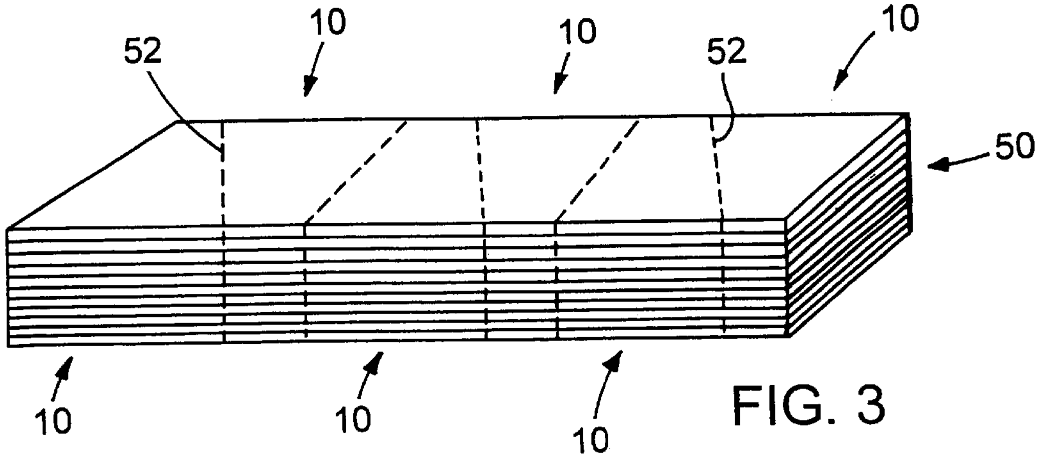
FIG. 3 is a perspective view of a bar of amorphous metal strips showing the cut lines to produce a plurality of generally trapezoidally-shaped magnetic components in accordance with the present invention.

The present invention also provides a method of constructing a bulk amorphous metal component. As shown in FIG. 2, a roll 30 of amorphous metal strip material is cut into a plurality of strips 20 having the same shape and size using cutting blades 40. The strips 20 are stacked to form a bar 50 of stacked amorphous metal strip material. The bar 50 is annealed, impregnated with an epoxy resin and cured. The bar 50 can be cut along the lines 52 depicted in FIG. 3 to produce a plurality of generally three-dimensional parts having a generally rectangular, trapezoidal, square, or other polyhedral shape. Alternatively, the component 10 may include at least one arcuate surface 12, as shown in FIG. 1C.

Figure 4:
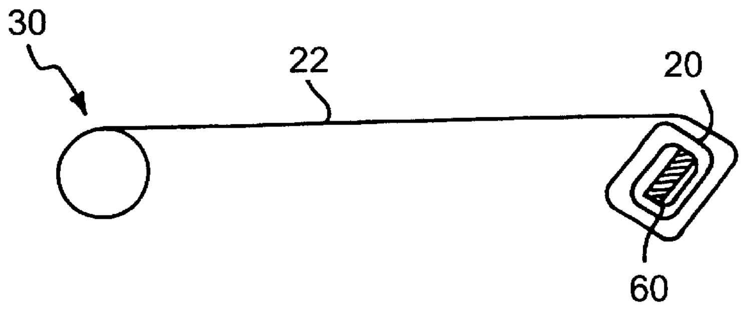
FIG. 4 is a side view of a coil of amorphous metal strip which is being wound about a mandrel to form a generally rectangular core in accordance with the present invention.
Figure 5:
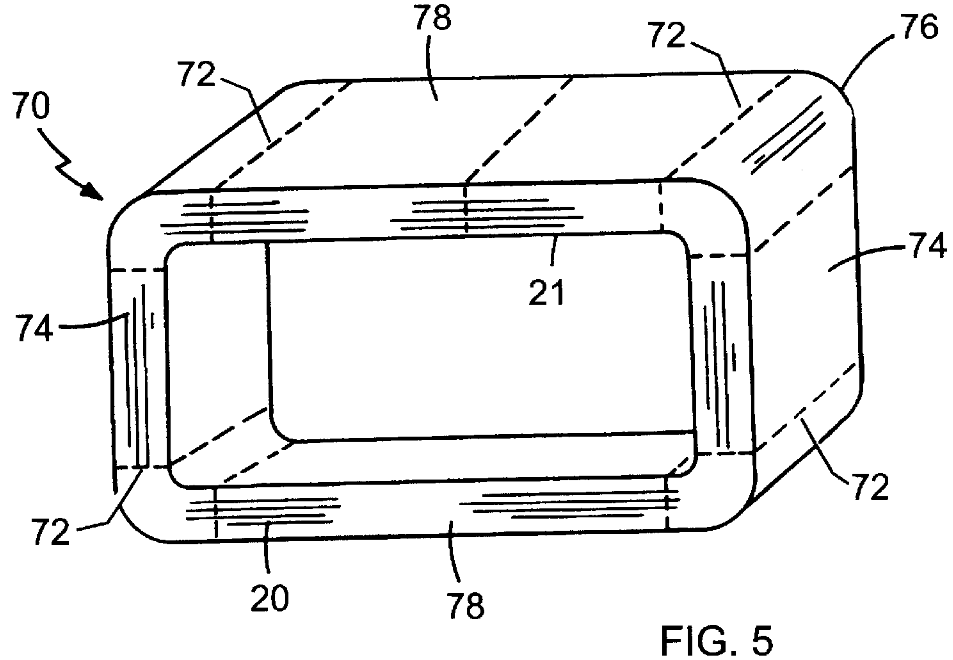
FIG. 5 is a perspective view of a generally rectangular amorphous metal core showing the cut lines to produce a plurality of generally prism-shaped magnetic components formed in accordance with the present invention.

In a second embodiment of the method of the present invention, shown in FIGS. 4 and 5, a bulk amorphous metal magnetic component 10 is formed by winding a single amorphous metal strip 22 or a group of amorphous metal strips 22 around a generally rectangular mandrel 60 to form a generally rectangular wound core 70. The height of the short sides 74 of the core 70 is preferably approximately equal to the desired length of the finished bulk amorphous metal magnetic component 10. The core 70 is annealed, impregnated with an epoxy resin and cured. Two components 10 may be formed by cutting the short sides 74, leaving the radiused corners 76 connected to the long sides 78. Additional magnetic components 10 may be formed by removing the radiused corners 76 from the long sides 78, and cutting the long sides 78 at a plurality of locations, indicated by the dashed lines 72. In the example illustrated in FIG. 5, the bulk amorphous metal component 10 has a generally three-dimensional rectangular shape, although other three-dimensional shapes are contemplated by the present invention such as, for example, trapezoids and squares.

Construction of bulk amorphous metal magnetic components in accordance with the present invention is especially suited for tiles for poleface magnets used in high performance MRI systems, in television and video systems, and in electron and ion beam systems. Magnetic component manufacturing is simplified and manufacturing time is reduced. Stresses otherwise encountered during the construction of bulk amorphous metal components are minimized. Magnetic performance of the finished components is optimized.

The bulk amorphous metal magnetic component 10 of the present invention can be manufactured using numerous amorphous metal alloys. Generally stated, the alloys suitable for use in the component 10 construction of the present invention are defined by the formula: $M_{70-85}$ $Y_{5-20}$ $Z_{0-20}$, subscripts in atom percent, where "M" is at least one of Fe, Ni and Co, "Y" is at least one of B, C and P, and "Z" is at least one of Si, Al and Ge; with the proviso that (i) up to ten (10) atom percent of component "M" can be replaced with at least one of the metallic species Ti, V, Cr, Mn, Cu, Zr, Nb, Mo, Ta and W, and (ii) up to ten (10) atom percent of components (Y+Z) can be replaced by at least one of the non-metallic species In, Sn, Sb and Pb. Highest induction values at low cost are achieved for alloys wherein "M" is iron, "Y" is boron and "Z" is silicon. For this reason, amorphous metal strip composed of iron-boron-silicon alloys defined essentially by the formula $Fe_{80}B_{11}Si_9$ is preferred. This strip is sold by AlliedSignal Inc. under the trade designation METLAS® alloy 2605SA-1.

The bulk amorphous metal magnetic component 10 of the present invention can be cut from bars 50 of stacked amorphous metal strip or from cores 70 of wound amorphous metal strip using numerous cutting technologies. The component 10 may be cut from the bar 50 or core 70 using a cutting blade or wheel. Alternately, the component 10 may be cut by electro-discharge machining or with a water jet.

Bulk amorphous magnetic components will magnetize and demagnetize more efficiently than components made from other iron-base magnetic metals. When used as a pole magnet, the bulk amorphous metal component will generate less heat than a comparable component made from another iron-base magnetic metal when the two components are magnetized at identical induction and frequency. The bulk amorphous metal component can therefore be designed to operate 1) at a lower operating temperature; 2) at higher induction to achieve reduced size and weight; or, 3) at higher frequency to achieve reduced size and weight, or to achieve superior signal resolution, when compared to magnetic components made from other iron-base magnetic metals.

The following examples are provided to more completely describe the present invention. The specific techniques, conditions, materials, proportions and reported data set forth to illustrate the principles and practice of the invention are exemplary and should not be construed as limiting the scope of the invention.

EXAMPLE 1

Preparation And Electro-Magnetic Testing of an Amorphous Metal Rectangular Prism $Fe_{80}B_{11}Si_9$ amorphous metal ribbon, approximately 60 mm wide and 0.022 mm thick, was wrapped around a rectangular mandrel or bobbin having dimensions of approximately 25 mm by 90 mm. Approximately 800 wraps of amorphous metal ribbon were wound around the mandrel or bobbin producing a rectangular core form having inner dimensions of approximately 25 mm by 90 mm and a build thickness of approximately 20 mm. The core/bobbin assembly was annealed in a nitrogen atmosphere. The anneal consisted of: 1) heating the assembly up to 365° C.; 2) holding the temperature at approximately 365° C. for approximately 2 hours; and, 3) cooling the assembly to ambient temperature. The rectangular, wound, amorphous metal core was removed from the core/bobbin assembly. The core was vacuum impregnated with an epoxy resin solution. The bobbin was replaced, and the rebuilt, impregnated core/bobbin assembly was cured at 120° C. for approximately 4.5 hours. When fully cured, the core was again removed from the core/bobbin assembly. The resulting rectangular, wound, epoxy bonded, amorphous metal core weighed approximately 2100 g.

A rectangular prism 60 mm long by 40 mm wide by 20 mm thick (approximately 800 layers) was cut from the epoxy bonded amorphous metal core with a 1.5 mm thick cutting blade. The cut surfaces of the rectangular prism and the remaining section of the core were etched in a nitric acid/water solution and cleaned in an ammonium hydroxide/water solution.

The remaining section of the core was etched in a nitric acid/water solution and cleaned in an ammonium hydroxide/water solution. The rectangular prism and the remaining section of the core were then reassembled into a full, cut core form. Primary and secondary electrical windings were fixed to the remaining section of the core. The cut core form was electrically tested at 60 Hz, 1,000 Hz, 5,000 Hz and 20,000 Hz and compared to catalogue values for other ferromagnetic materials in similar test configurations (National-Arnold Magnetics, 17030 Muskrat Avenue, Adelanto, Calif. 92301 (1995)). The results are compiled below in Tables 1, 2, 3 and 4.

TABLE 1

Core Loss @ 60 Hz (W/kg)

| | Material | | | | |
|---|---|---|---|---|---|
| Flux Density | Amorphous $Fe_{80}B_{11}Si_9$ (22 μm) | Crystalline Fe—3% Si (25 μm) National-Arnold Magnetics Silectron | Crystalline Fe—3% Si (50 μm) National-Arnold Magnetics Silectron | Crystalline Fe—3% Si (175 μm) National-Arnold Magnetics Silectron | Crystalline Fe—3% Si (275 μm) National-Arnold Magnetics Silectron |
| 0.3 T | 0.10 | 0.2 | 0.1 | 0.1 | 0.06 |
| 0.7 T | 0.33 | 0.9 | 0.5 | 0.4 | 0.3 |
| 0.8 T | | 1.2 | 0.7 | 0.6 | 0.4 |
| 1.0 T | | 1.9 | 1.0 | 0.8 | 0.6 |
| 1.1 T | 0.59 | | | | |
| 1.2 T | | 2.6 | 1.5 | 1.1 | 0.8 |
| 1.3 T | 0.75 | | | | |
| 1.4 T | 0.85 | 3.3 | 1.9 | 1.5 | 1.1 |

TABLE 2

Core Loss @ 1,000 Hz (W/kg)

| | Material | | | | |
|---|---|---|---|---|---|
| Flux Density | Amorphous $Fe_{80}B_{11}Si_9$ (22 μm) | Crystalline Fe—3% Si (25 μm) National-Arnold Magnetics Silectron | Crystalline Fe—3% Si (50 μm) National-Arnold Magnetics Silectron | Crystalline Fe—3% Si (175 μm) National-Arnold Magnetics Silectron | Crystalline Fe—3% Si (275 μm) National-Arnold Magnetics Silectron |
| 0.3 T | 1.92 | 2.4 | 2.0 | 3.4 | 5.0 |
| 0.5 T | 4.27 | 6.6 | 5.5 | 8.8 | 12 |
| 0.7 T | 6.94 | 13 | 9.0 | 18 | 24 |
| 0.9 T | 9.92 | 20 | 17 | 28 | 41 |
| 1.0 T | 11.51 | 24 | 20 | 31 | 46 |

TABLE 2-continued

| Core Loss @ 1,000 Hz (W/kg) | | | | | |
|---|---|---|---|---|---|
| | Material | | | | |
| Flux Density | Amorphous $Fe_{80}B_{11}Si_9$ (22 μm) | Crystalline Fe—3% Si (25 μm) National-Arnold Magnetics Silectron | Crystalline Fe—3% Si (50 μm) National-Arnold Magnetics Silectron | Crystalline Fe—3% Si (175 μm) National-Arnold Magnetics Silectron | Crystalline Fe—3% Si (275 μm) National-Arnold Magnetics Silectron |
| 1.1 T | 13.46 | | | | |
| 1.2 T | 15.77 | 33 | 28 | | |
| 1.3 T | 17.53 | | | | |
| 1.4 T | 19.67 | 44 | 35 | | |

TABLE 3

| Core Loss @ 5,000 Hz (W/kg) | | | | |
|---|---|---|---|---|
| | Material | | | |
| Flux Density | Amorphous $Fe_{80}B_{11}Si_9$ (22 μm) | Crystalline Fe—3% Si (25 μm) National-Arnold Magnetics Silectron | Crystalline Fe—3% Si (50 μm) National-Arnold Magnetics Silectron | Crystalline Fe—3% Si (175 μm) National-Arnold Magnetics Silectron |
| 0.04 T | 0.25 | 0.33 | 0.33 | 1.3 |
| 0.06 T | 0.52 | 0.83 | 0.80 | 2.5 |
| 0.08 T | 0.88 | 1.4 | 1.7 | 4.4 |
| 0.10 T | 1.35 | 2.2 | 2.1 | 6.6 |
| 0.20 T | 5 | 8.8 | 8.6 | 24 |
| 0.30 T | 10 | 18.7 | 18.7 | 48 |

TABLE 4

| Core Loss @ 20,000 Hz (W/kg) | | | | |
|---|---|---|---|---|
| | Material | | | |
| Flux Density | Amorphous $Fe_{80}B_{11}Si_9$ 22 μm) | Crystalline Fe—3% Si (25 μm) National-Arnold Magnetics Silectron | Crystalline Fe—3% Si (50 μm) National-Arnold Magnetics Silectron | Crystalline Fe—3% Si (175 μm) National-Arnold Magnetics Silectron |
| 0.04 T | 1.8 | 2.4 | 2.8 | 16 |
| 0.06 T | 3.7 | 5.5 | 7.0 | 33 |
| 0.08 T | 6.1 | 9.9 | 12 | 53 |
| 0.10 T | 9.2 | 15 | 20 | 88 |
| 0.20 T | 35 | 57 | 82 | |
| 0.30 T | 70 | 130 | | |

EXAMPLE 2

Preparation of an Amorphous Metal Trapezoidal Prism $Fe_{80}B_{11}Si_9$ amorphous metal ribbon, approximately 48 mm wide and 0.022 mm thick, was cut into lengths of approximately 300 mm. Approximately 3,800 layers of the cut amorphous metal ribbon were stacked to form a bar approximately 48 mm wide and 300 mm long, with a build thickness of approximately 96 mm. The bar was annealed in a nitrogen atmosphere. The anneal consisted of: 1) heating the bar up to 365° C.; 2) holding the temperature at approximately 365° C. for approximately 2 hours; and, 3) cooling the bar to ambient temperature. The bar was vacuum impregnated with an epoxy resin solution and cured at 120° C. for approximately 4.5 hours. The resulting stacked, epoxy bonded, amorphous metal bar weighed approximately 9000 g.

A trapezoidal prism was cut from the stacked, epoxy bonded amorphous metal bar with a 1.5 mm thick cutting blade. The trapezoid-shaped face of the prism had bases of 52 and 62 mm and height of 48 mm. The trapezoidal prism was 96 mm (3,800 layers) thick. The cut surfaces of the trapezoidal prism and the remaining section of the core were etched in a nitric acid/water solution and cleaned in an ammonium hydroxide/water solution.

EXAMPLE 3

Preparation of Polygonal, Bulk Amorphous Metal Components With Arc-Shaped Cross-Sections $Fe_{81}B_{11}Si_9$ amorphous metal ribbon, approximately 50 mm wide and 0.022 mm thick, was cut into lengths of approximately 300 mm. Approximately 3,800 layers of the cut amorphous metal ribbon were stacked to form a bar approximately 50 mm wide and 300 mm long, with a build thickness of approximately 96 mm. The bar was annealed in a nitrogen atmosphere. The anneal consisted of: 1) heating the bar up to 365° C.; 2) holding the temperature at approximately 365° C. for approximately 2 hours; and, 3) cooling the bar to ambient temperature. The bar was vacuum impregnated with an epoxy resin solution and cured at 120° C. for approximately 4.5 hours. The resulting stacked, epoxy bonded, amorphous metal bar weighed approximately 9200 g.

The stacked, epoxy bonded, amorphous metal bar was cut using electro-discharge machining to form a three-dimensional, arc-shaped block. The outer diameter of the block was approximately 96 mm. The inner diameter of the block was approximately 13 mm. The arc length was approximately 90°. The block thickness was approximately 96 mm.

$Fe_{81}B_{11}Si_9$ amorphous metal ribbon, approximately 20 mm wide and 0.022 mm thick, was wrapped around a circular mandrel or bobbin having an outer diameter of approximately 19 mm. Approximately 1,200 wraps of amorphous metal ribbon were wound around the mandrel or bobbin producing a circular core form having an inner diameter of approximately 19 mm and an outer diameter of approximately 48 mm. The core had a build thickness of approximately 29 mm. The core was annealed in a nitrogen atmosphere. The anneal consisted of: 1) heating the bar up to 365° C.; 2) holding the temperature at approximately 365° C. for approximately 2 hours; and, 3) cooling the bar to ambient temperature. The core was vacuum impregnated with an epoxy resin solution and cured at 120° C. for approximately 4.5 hours. The resulting wound, epoxy bonded, amorphous metal core weighed approximately 71 g.

The wound, epoxy bonded, amorphous metal core was cut using a water jet to form a semi-circular, three dimensional shaped object. The semi-circular object had an inner diameter of approximately 19 mm, an outer diameter of approximately 48 mm, and a thickness of approximately 20 mm.

The cut surfaces of the pologonal, bulk amorphous metal components with arc-shaped cross sections were etched in a nitric acid/water solution and cleaned in an ammonium hydroxide/water solution.

Having thus described the invention in rather full detail, it will be understood that such detail need not be strictly adhered to but that various changes and modifications may suggest themselves to one skilled in the art, all falling within the scope of the present invention as defined by the subjoined claims.

What is claimed is:

1. A bulk amorphous metal magnetic component comprising a plurality of substantially similar shaped layers of ferromagnetic amorphous metal strips laminated together by impregnating the component with an epoxy resin and curing to form a polyhedrally shaped part.

2. A bulk amorphous metal magnetic component as recited by claim 1, each of said amorphous metal strips having a composition defined essentially by the formula: $M_{70-85} Y_{5-20} Z_{0-20}$, subscripts in atom percent, where "M" is at least one of Fe, Ni and Co, "Y" is at least one of B, C and P, and "Z" is at least one of Si, Al and Ge; with the provisos that (i) up to 10 atom percent of component "M" can be replaced with at least one of the metallic species Ti, V, Cr, Mn, Cu, Zr, Nb, Mo, Ta and W, and (ii) up to 10 atom percent of components (Y+Z) can be replaced by at least one of the non-metallic species In, Sn, Sb and Pb.

3. A bulk amorphous metal magnetic component as recited by claim 2, wherein each of said strips has a composition defined essentially by the formula $Fe_{80}B_{11}Si_9$.

4. A bulk amorphous metal magnetic component as recited by claim 2, wherein said component has the shape of a three-dimensional polyhedron with at least one rectangular cross-section.

5. A bulk amorphous metal magnetic component as recited by claim 2, wherein said component has the shape of a three-dimensional polyhedron with at least one trapezoidal cross-section.

6. A bulk amorphous metal magnetic component as recited by claim 2, wherein said component has the shape of a three-dimensional polyhedron with at least one square cross-section.

7. A bulk amorphous metal magnetic component as recited by claim 2, wherein said component includes an arcuate surface.

8. A bulk amorphous metal magnetic component as recited by claim 1, wherein said magnetic component has a core-loss of less than or approximately equal to 1 watt-per-kilogram of amorphous metal material when operated at a frequency of approximately 60 Hz and at a flux density of approximately 1.4 T.

9. A bulk amorphous metal magnetic component as recited by claim 1, wherein said magnetic component has a core-loss of less than or approximately equal to 70 watts-per-kilogram of amorphous metal material when operated at a frequency of approximately 20,000 Hz and at a flux density of approximately 0.30 T.

10. A bulk amorphous metal magnetic component as recited by claim 1, wherein said magnetic component has a core-loss of less than or approximately equal to 1 watt-per-kilogram of amorphous metal material when operated at a frequency of approximately 60 Hz and at a flux density of approximately 1.4 T, and wherein said magnetic component has a core-loss of less than or approximately equal to 70 watts-per-kilogram of amorphous metal material when operated at a frequency of approximately 20,000 Hz and at a flux density of approximately 0.30 T.

11. A method of constructing a bulk amorphous metal magnetic component comprising the steps of:

(a) cutting ferromagnetic amorphous metal strip material to form a plurality of cut strips having a predetermined length;

(b) stacking said cut strips to form a bar of stacked ferromagnetic amorphous metal strip material;

(c) annealing said stacked bar;

(d) impregnating said stacked bar with an epoxy resin and curing said resin impregnated stacked bar; and (e) cutting said stacked bar at predetermined lengths to provide a plurality of polyhedrally shaped magnetic components having a predetermined three-dimensional geometry.

12. A method of constructing a bulk amorphous metal magnetic component as recited by claim 11, wherein said step (a) comprises cutting amorphous metal strip material using a cutting blade, a cutting wheel, a water jet or an electro-discharge machine.

13. A method of constructing a bulk amorphous metal magnetic component comprising the steps of:

(a) winding a ferromagnetic amorphous metal ribbon about a mandrel to form a generally rectangular core having generally radiused corners;

(b) annealing said wound, rectangular core;

(c) impregnating said wound, rectangular core with an epoxy resin and curing said epoxy resin impregnated rectangular core;

(d) cutting the short sides of said generally rectangular core to form two polyhedrally shaped magnetic components having a predetermined three-dimensional geometry that is the approximate size and shape of said short sides of said generally rectangular core;

(e) removing the generally radiused comers from the long sides of said generally rectangular core; and (f) cutting the long sides of said generally rectangular core to form a plurality of magnetic components having said predetermined three-dimensional geometry.

14. A bulk amorphous metal magnetic component constructed in accordance with the method of claim 12.

15. A bulk amorphous metal magnetic component as recited by claim 14, each of said cut strips of amorphous metal having a composition defined essentially by the formula: $M_{70-85} Y_{5-20} Z_{0-20}$, subscripts in atom percent, where "M" is at least one of Fe, Ni and Co, "Y" is at least one of B, C and P, and "Z" is at least one of Si, Al and Ge; with the provisos that (i) up to 10 atom percent of component "M" can be replaced with at least one of the metallic species Ti, V, Cr, Mn, Cu, Zr, Nb, Mo, Ta and W, and (ii) up to 10 atom percent of components (Y+Z) can be replaced by at least one of the non-metallic species In, Sn, Sb and Pb.

16. A bulk amorphous metal magnetic component as recited by claim 15, wherein each of said plurality of cut strips has a composition defined essentially by the formula $Fe_{80}B_{11}Si_9$.

17. A bulk amorphous metal magnetic component as recited by claim 15, wherein said component has the shape of a three-dimensional polyhedron with at least one rectangular cross-section.

18. A bulk amorphous metal magnetic component as recited by claim 15, wherein said component has the shape of a three-dimensional polyhedron with at least one trapezoidal cross-section.

19. A bulk amorphous metal magnetic component as recited by claim 15, wherein said component has the shape of a three-dimensional polyhedron with at least one square cross-section.

20. A bulk amorphous metal magnetic component as recited by claim 15, wherein said component includes an arcuate surface.

21. A bulk amorphous metal magnetic component as recited by claim 14, wherein said magnetic component has a core-loss of less than or approximately equal to 1 watt-per-kilogram of amorphous metal material when operated at a frequency of approximately 60 Hz and a flux density of approximately 1.4 T.

22. A bulk amorphous metal magnetic component as recited by claim 14, wherein said magnetic component has a core-loss of less than or approximately equal to 70 watts-per-kilogram of amorphous metal material when operated at a frequency of approximately 20,000 Hz and a flux density of approximately 0.30 T.

23. A bulk amorphous metal magnetic component as recited by claim 14, wherein said magnetic component has a core-loss of less than or approximately equal to 1 watt-per-kilogram of amorphous metal material when operated at a frequency of approximately 60 Hz and at a flux density of approximately 1.4 T, and wherein said magnetic component has a core-loss of less than or approximately equal to 70 watts-per-kilogram of amorphous metal material when operated at a frequency of approximately 20,000 Hz and at a flux density of approximately 0.30 T.

24. A bulk amorphous metal magnetic component constructed in accordance with the method of claim 13.

25. A bulk amorphous metal magnetic component as recited by claim 24, each of said cut strips of amorphous metal having a composition defined essentially by the formula: $M_{70-85}\ Y_{5-20}\ Z_{0-20}$, subscripts in atom percent, where "M" is at least one of Fe, Ni and Co, "Y" is at least one of B, C and P, and "Z" is at least one of Si, Al and Ge; with the provisos that (i) up to 10 atom percent of component "M" can be replaced with at least one of the metallic species Ti, V, Cr, Mn, Cu, Zr, Nb, Mo, Ta and W, and (ii) up to 10 atom percent of components (Y+Z) can be replaced by at least one of the non-metallic species In, Sn, Sb and Pb.

26. A bulk amorphous metal magnetic component as recited by claim 25, wherein said amorphous metal ribbon has a composition defined essentially by the formula $Fe_{80}B_{11}Si_9$.

27. A bulk amorphous metal magnetic component as recited by claim 25, wherein said predetermined three-dimensional geometry is generally rectangular.

28. A bulk amorphous metal magnetic component as recited by claim 25, wherein said predetermined three-dimensional geometry is generally square.

29. A bulk amorphous metal magnetic component as recited by claim 24, wherein said magnetic component has a core-loss of less than or approximately equal to 1 watt-per-kilogram of amorphous metal material when operated at a frequency of approximately 60 Hz and a flux density of approximately 1.4 T.

30. A bulk amorphous metal magnetic component as recited by claim 24, wherein said magnetic component has a core-loss of less than or approximately equal to 70 watts-per-kilogram of amorphous metal material when operated at a frequency of approximately 20,000 Hz and a flux density of approximately 0.30 T.

31. A bulk amorphous metal magnetic component as recited by claim 24, wherein said magnetic component has a core-loss of less than or approximately equal to 1 watt-per-kilogram of amorphous metal material when operated at a frequency of approximately 60 Hz and at a flux density of approximately 1.4 T, and wherein said magnetic component has a core-loss of less than or approximately equal to 70 watts-per-kilogram of amorphous metal material when operated at a frequency of approximately 20,000 Hz and at a flux density of approximately 0.30 T.

* * * * *